Patented Jan. 15, 1924.

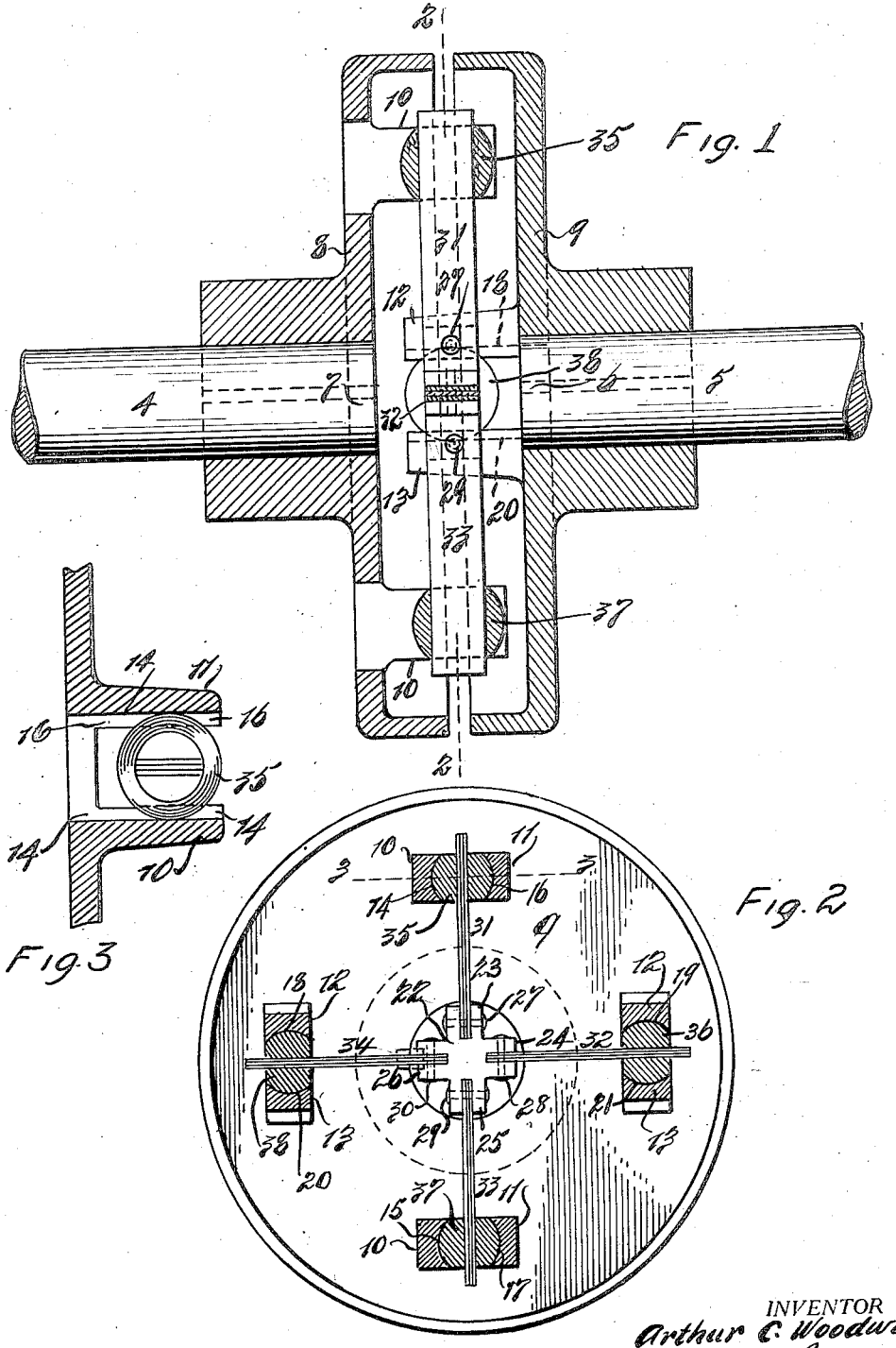

1,480,648

UNITED STATES PATENT OFFICE.

ARTHUR C. WOODWARD, OF CRANFORD, NEW JERSEY, ASSIGNOR TO THE A. & F. BROWN COMPANY, OF ELIZABETHPORT, NEW JERSEY, A CORPORATION OF NEW JERSEY.

FLEXIBLE COUPLING.

Application filed April 5, 1922. Serial No. 549,833.

*To all whom it may concern:*

Be it known that I, ARTHUR C. WOODWARD, a citizen of the United States, and a resident of Cranford, in the county of Union and State of New Jersey, have invented certain new and useful Improvements in Flexible Couplings, of which the following is a specification, reference being made to the accompanying drawings, forming a part thereof.

My invention relates to flexible couplings for the mechanical inter-connection of rotatable elements, such as shafts or axles, and the objects of my invention are, among other things, to provide a device of this character to ensure the proper transmission of power without shock from one shaft to the other in case such coupled shafts are out of true alinement, and also when they are out of level or center, whereby the parts of the coupling readily adjust themselves to accommodate such irregularities in alinement or "out of center" position, thus ensuring at all times the proper movements of the shafts so coupled; also to reduce the wear of the coacting parts comprising my improved coupling and to provide a flexible coupling which shall be simple and rugged in construction, as well as effective in operation with parts that may be readily assembled and likewise removable for inspection or replacement. A further object of my invention is to distribute the strains equally throughout the various parts so as to avoid any undue pressure on the bearings, and also to provide in such flexible coupling means for electrically insulating one shaft from the other.

With these and other objects in view, the invention comprises the novel features of construction as hereinafter shown and described, and then particularly pointed out in the appended claims.

A preferred embodiment of the invention is shown in the accompanying drawings in which—

Fig. 1 is a longitudinal central section of my improved coupling as keyed to the shaft ends;

Fig. 2 is a vertical sectional view taken on the line 2—2 of Fig. 1; and

Fig. 3 is an enlarged detail sectional view taken on the line 3—3 of Fig. 2 showing parts of my coupling in assembled position.

Similar numerals refer to similar parts throughout the several figures.

Referring to the drawings, the ends 4 and 5 of the two shafts 6 and 7 respectively, which are to be coupled together by my improved device, each have keyed or otherwise secured to such shaft ends the disks 8 and 9 respectively as shown in Fig. 1. Each disk is preferably formed of cast iron and has cast on the inner surface thereof two oppositely disposed lugs, the disk 8 carrying the lugs 10 and 11, while the disk 9 carries the lugs 12 and 13. The height of each of these lugs is such as to pass beyond the longitudinal plane of the coupling as shown in Fig. 1. Each of the lugs 10, 11, 12 and 13 has a hole drilled therein all of said holes being equi-distantly from the centers of the disks 8 and 9, and parallel to the bore of such disks. The diameters of such holes is greater than the width of the lugs as shown in Fig. 2, whereby each lug has its sides forming open guideways 14 and 15 at either end of the lug 10, and similar guideways 16 and 17 for the lug 11, guideways 18 and 19 for the lug 12, and guideways 20 and 21 for the lug 13.

The inner floating member of my coupling comprises the center 22 preferably formed of steel and having four radial jaws 23, 24, 25 and 26 in which are held by bolts 27, 28, 29 and 30 respectively the inner ends of radially disposed bunches of flexible or spring shims 31, 32, 33 and 34 respectively, though single spring members may be secured to the jaws 23, 24, 25 and 26 if desired. Slidably mounted on each of the shims 31, 32, 33 and 34 is a centrally slotted truncated sphere 35, 36, 37 and 38 respectively, preferably made of bakelite or other insulating material, such spheres sliding freely on the flexible shims by means of the central slots cut in such spheres, as shown in Figs. 2 and 3.

When my coupling is assembled the oppositely disposed spheres 35 and 37 are inserted in the guideways 14, 15 and 16, 17 respectively of the disk 8, while the spheres 36 and 38 are inserted in the guideways 18, 19 and 20, 21 respectively of the disk 9;

then the disks 8 and 9 are brought into juxtaposition as shown in Fig. 1 with each of the spheres 35, 36, 37 and 38 rotatably mounted in and coacting with the four lugs 10, 11, 12 and 13 formed in the disks 8 and 9, the inner floating member 22 with its four flexible shims engaging the four spheres acting to interconnect the two disks 8 and 9. After assembling the coupling as just described there will be no inter-movement of the parts when the shafts 6 and 7 are in exact axial alinement. However when the shafts are out of line, but with the center line of one shaft passing through the center line of the other shaft at the exact center of the coupling, my improved device will operate and function as a universal joint; in addition when the two shafts 6 and 7 are off level or out of center so that the axis of one shaft is above or below that of the other, then this misalinement will be taken care of by the slippage of the spring shims in their respective spheres which will also oscillate in their guideways to enable the coupling to adjust itself according to requirements. At all times and in whatever relative positions of the shafts 6 and 7, the shock of starting or varying loads on the shafts will be relieved by the spring shims operating in their respective spheres. This inner floating connection between the disks 8 and 9, being particularly free of movement in all directions due to these four radial spring members and their sliding engagement in the oscillatable spheres, provides a perfect flexible coupling in all conditions of operation when the shafts are out of true axial alinement, or out of center one with the other. The construction of the spheres out of bakelite or other insulating material completely insulates the disks 8 and 9 from each other which is advantageous under many conditions of usage.

While only one embodiment of the invention has been shown and described, various other embodiments may be used without departing from the principles of my invention or the scope thereof as set forth in the appended claims.

I claim as my invention:

1. A flexible coupling comprising two abutting coupling members, means capable of universal rotation mounted in said members, and an inner floating member having radially disposed arms engaging said means.

2. A flexible coupling comprising two abutting coupling members, opposed pairs of separate means capable of universal rotation mounted in each of said members, and an inner floating member having radially disposed arms engaging said means.

3. A flexible coupling comprising two abutting coupling members, opposed pairs of separate means capable of universal rotation mounted in each of said members, and an inner floating member having radially disposed arms slidably engaging said means.

4. In a flexible coupling, two shaft-engaging disks each having pairs of oppositely disposed guideways, means capable of universal rotation carried in said guideways, and an inner floating member having radially disposed arms engaging said means.

5. In a flexible coupling, two shaft-engaging disks each having two pairs of oppositely disposed guideways, four spheres centrally slotted carried in said pairs of guideways, and an inner floating member having four arms engaging said spheres in said slots.

6. In a flexible coupling, two abutting coupling members and an inner floating member having radially-disposed arms connected to spheres rotatably mounted in said coupling members.

7. In a flexible coupling, two abutting coupling members and an inner floating member having radially-disposed arms slidably connected to spheres rotatably mounted in said coupling members.

8. In a flexible coupling, two abutting coupling members and an inner floating member having pairs of oppositely-disposed arms connected to pairs of opposed spheres rotatably mounted in each of said coupling members.

9. In a flexible coupling, two abutting coupling members and an inner floating member having pairs of oppositely-disposed arms slidably connected to pairs of opposed spheres rotatably mounted in each of said coupling members.

10. In a flexible coupling, two shaft-engaging disks each having pairs of oppositely disposed guideways, means capable of universal rotation carried in said guideways, and an inner floating member having radially disposed flexible arms slidably connected to said means.

11. In a flexible coupling, two shaft-engaging disks each having two pairs of oppositely disposed guideways, four spheres centrally slotted carried in said pairs of guideways, and an inner floating member having four flexible arms slidably connected to said spheres in said slots.

12. In a flexible coupling, two abutting coupling members and an inner floating member having radially-disposed spring arms connected to spheres rotatably mounted in said coupling members.

13. In a flexible coupling, two abutting coupling members and an inner floating member having radially-disposed spring arms slidably connected to spheres rotatably mounted in said coupling members.

ARTHUR C. WOODWARD.